United States Patent
Wurm et al.

[11] Patent Number: 5,960,588
[45] Date of Patent: Oct. 5, 1999

[54] DEVICE AND PROCESS FOR ADJUSTMENT OF A FRAMELESS WINDOW PANE MOVED BY A TWO-STRAND CABLE WINDOW LIFTER

[75] Inventors: Georg Wurm, Rochester Hills; David Clements, Auburn Hills, both of Mich.

[73] Assignee: Brose Fahrzeugteile GmbH & Co. KG, Coburg, Germany

[21] Appl. No.: 08/822,390

[22] Filed: Mar. 20, 1997

[30] Foreign Application Priority Data

Mar. 21, 1996 [DE] Germany .......................... 196 11 074

[51] Int. Cl.⁶ ........................................................ E05F 11/48
[52] U.S. Cl. .................................. 49/352; 49/212; 49/502
[58] Field of Search .............................. 49/212, 209, 502, 49/352, 349

[56] References Cited

U.S. PATENT DOCUMENTS

| | | | |
|---|---|---|---|
| 4,880,046 | 11/1989 | Gesy | 49/212 X |
| 4,956,942 | 9/1990 | Lisak et al. | 49/502 |
| 5,632,121 | 5/1997 | Handle et al. | 49/502 |
| 5,673,515 | 10/1997 | Weber et al. | 49/352 |

FOREIGN PATENT DOCUMENTS

| | | |
|---|---|---|
| 1197209 | 11/1959 | France . |
| 3613978 | 9/1987 | Germany . |
| 3723679 | 1/1989 | Germany . |
| 4122554 | 1/1993 | Germany . |
| 4140574 | 6/1993 | Germany . |
| 4427989 | 2/1996 | Germany . |

*Primary Examiner*—Jerry Redman
*Attorney, Agent, or Firm*—Christie, Parker & Hale, LLP

[57] ABSTRACT

Apparatus for adjusting a frameless window pane moved by a cable window lifter in an automobile. The apparatus includes a first guide rail which has an unlocked and a locked state, and a second guide rail. The first guide rail is freely movable to a limited degree in the unlocked state and fixed in the locked state. A window pane is connected between the first guide rail and the second guide rail such that movement of the second guide rail causes the first guide rail to move when in its unlocked state. A bolt is provided for moving the second guide rail and for locking the first guide rail.

20 Claims, 2 Drawing Sheets

DEVICE AND PROCESS FOR ADJUSTMENT
OF A FRAMELESS WINDOW PANE MOVED
BY A TWO-STRAND CABLE WINDOW
LIFTER

BACKGROUND OF THE INVENTION

This application is directed generally to the automotive vehicle arts, and more particularly to a window adjustment assembly for adjusting the tilt or angle of a window of an automotive vehicle relative to a body panel or door panel of the vehicle.

The present invention is directed to apparatus particularly suited for use in so-called frameless vehicle windows. Such windows are commonly found in automotive vehicles such as passenger automobiles which are provided with convertible tops or in the so-called hardtop or coupe style. In such vehicles, the upper portion of the door or other body panel does not completely frame the window. In fact, it is common to provide no frame whatever for the window when the same is fully raised relative to the door or other body panel. However, it is desirable that the window properly mate with and/or seal with gaskets or the like which are provided in the vehicle roof or top, whether the top is of the convertible variety or of fixed variety.

From DE-A1 41 22 554, a frameless window pane for a motor vehicle is known in which the window is sealed by means of a compression spring guided on a bolt around the area of the window sill which presses the window in the direction of the vehicle interior, i.e., against the gasket area. The disadvantage of this technical solution consists in that to ensure an adequate seal at high speeds, comparatively high forces must be applied by the compression spring. This also results in correspondingly high frictional forces between the window pane and the gasket when raising and lowering the window such that a very powerful drive must be used.

From FR 1 197 709 and U.S. Pat. No. 4,956,942, adjustment and locking mechanisms are known which are mounted to the body of the door and engage the bottom of a window guide. By means of a rotational adjustment movement of a threaded bolt or a spindle, the desired tilting movement of the window pane is achieved. The adjustment position of a threaded bolt mounted in a threaded bushing may be locked by a lock nut.

The above-described solutions have the disadvantage in use for a two-strand cable window lifter because stresses develop readily in the material of the window pane, in particular when two guide rails of the two-strand cable window lifter are adjusted separately. Such stresses may even result in breakage of the window pane.

DE 37 23 679 C2 describes another variant for adjustment of a frameless window pane. It uses an aggregate support which is rotatably suspended in the sill area of the vehicle door, and which supports the window lifter and the window pane guidance means. In the center area of the aggregate support, a motorized movement device is attached which can be used for adjustment of the aggregate support for an optimal tilt angle of the window pane. As a result of the necessary high torsional strength of the aggregate support, the vehicle door is relatively heavy. In addition, the expensive motorized adjustment device significantly affects costs.

DE 36 13 978 C1 discloses a motor vehicle door with an aggregate support which accommodates a plurality of built-in components, in particular a window guidance for a window pane which can be lowered in a cavity between the aggregate support and the exterior door panel. In the area of the bottom of the door, two adjustment devices with adjustment bolts are provided on which the window guide may swivel relative to the aggregate support.

Again, by adjusting the two window guides separately, there is a significant danger that with a window pane adjustment, mechanical stresses can occur which can result in breakage of the pane. Such successive adjustment of the two adjustment bolts does not provide a worker sufficient feedback to correctly estimate the magnitude of the mechanical stresses.

SUMMARY OF THE INVENTION

The object of the invention is to develop a device and a process for adjustment of a frameless window pane moved by a two-strand cable window lifter by means of a lateral movement of the bottom of the guide rails which tilts the window pane and reliably ensures simple adjustment of the window pane without the risk of unwanted stresses.

The invention enables the adjustment of a frameless window pane by laterally adjusting the lower ends of the guide rails of a two-strand cable window lifter into or away from the passenger compartment. The apparatus includes a first guide rail which has an unlocked and a locked state, and a second guide rail. The first guide rail is freely movable to a limited degree in the unlocked state and fixed in the locked state. A window pane is connected between the first guide rail and the second guide rail such that movement of the second guide rail causes the first guide rail to move when in its unlocked state. According to the invention, the adjustment of one guide rail occurs by a forced displacement caused, for example, by adjustment of a threaded bolt engaging a threaded housing mounted to the motor vehicle. The lower end of the other guide rail is freely movable within an adjustment range when the locking means is released. Preferably the locking means is delimited by the edge surfaces of an elongated hole in an angular mounting bracket connected to the guide rail.

To adjust the window pane, the locking means of a first guide rail, which, in the released state, is freely movable at the lower mounting point, is first released. Next, the means for forced displacement of a second guide rail is activated until the window pane has reached the intended position. Then, the adjustment means, for example, an adjusting bolt, is secured, thus precluding an unintended change in the tilt of the window pane. Now, the first guide rail is fixed at the freely movable lower mounting point by the locking means provided for that purpose, for example, a bolt. If necessary, a small additional correction in the position of the guide in question may be made before locking. Such corrections may be made because of the elasticity of the system comprising the window lifter and the window pane, since one-hundred percent tracking of one mounting point during the adjustment of the other mounting point is generally not likely.

However, it is ensured with the device according to the invention that stresses of the system comprising the window lifter and the window pane are avoided during the adjustment process. Such stresses are often the cause for difficult movement of the window pane or even for its breakage.

Ideally, the adjusting and locking means of the two guide rails of the two-strand cable window lifter can be activated through the bottom of the door to ensure a simple readjustment of the window pane without having to remove the inside door panel. Mechanisms suitable for activation of the adjustment bolt which route the course of the activating force through the bottom of the door are adequately known. In addition to cardan joints, combinations of a worm and a worm screw or gears with bevel gearing are suitable.

A preferred variant of the invention provides, to the extent possible, for using the axles of the cable rollers directly for mounting in the vehicle door and thus ensuring an improved introduction of force into the door while bypassing lifter effects. In this variant, it is possible to use the lower axles simultaneously for adjustment of the associated guide rails.

BRIEF DESCRIPTION OF THE DRAWINGS

The invention is explained in detail in the following with reference to one exemplary embodiment shown in FIG. 1.

DETAILED DESCRIPTION

Figure 1:
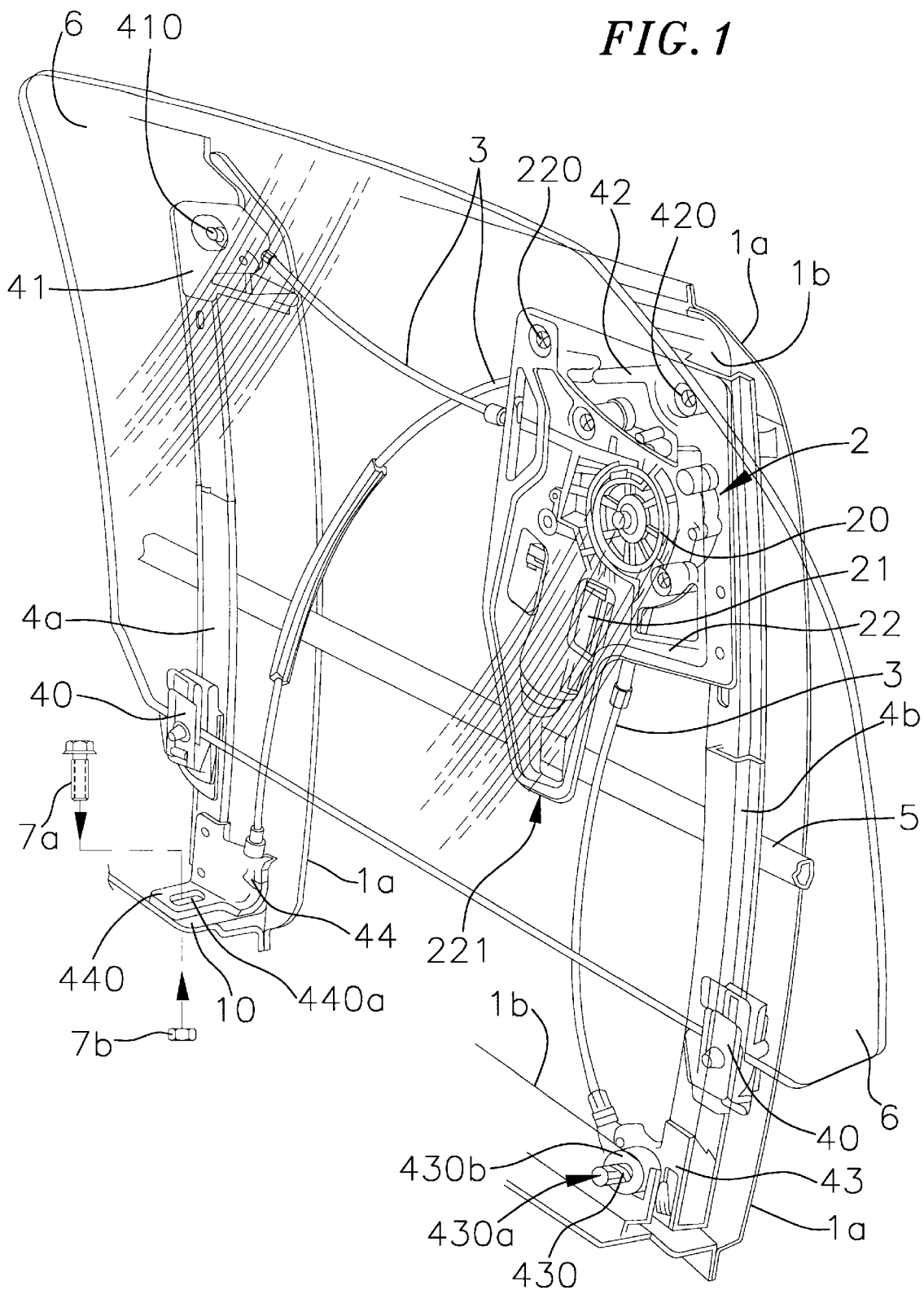

FIG. 1 depicts in perspective a two-strand Bowden-casing window lifter and selected associated portions of the vehicle door.

The figure depicts a so-called outside window lifter system. The window lifter system is disposed between exterior door panel 1a and window pane 6. The window lifter system includes two guide rails 4a, 4b, on which clamping fasteners 40 are movably mounted for connection with the bottom edge of the window pane 6. Angular retaining brackets 41, 42, 43, 44 are secured on the ends of the guide rails 4a, 4b, on which brackets cable rollers (not shown) are mounted, by means of axles 410, 420, 430, to guide cables (not shown) contained in casing 3. These brackets support the ends of casing 3. The closed cable casing necessary to transfer force thus extends between the guide rollers along the guide rails 4a, 4b, whereby the cable is connected at two points with sliders of the clamping fasteners 40 and directed through the casing 3 to the respective other guide rail 4a, 4b, or to the drive unit 2. The driving force is generated by a motor 21 and introduced into a transmission 20, which includes a cable drum (not shown). A plurality of windings of the cable on the cable drum and, if necessary, a form-fitting connection between the cable and the cable drum, ensure the transfer of force to the cable via a cable nipple connector (not shown). The drive unit 2 is mounted on a base plate 22, which has, in turn, mounting points 220, 221 on inside door panel 1b or on pipe 5.

FIG. 1 depicts schematically only one of the possible variant embodiments of the lower adjustment and locking means for the guide rails 4a, 4b, whereby one mounting area 440 is essentially freely movable within the possible path of adjustment when the associated locking means is released, whereas the other mounting area 43 is movable only to the extent of the activation of the adjustment means, by way of example, an adjustable threaded bolt, even with the associated locking means released.

The first mounting area comprises an angular mounting bracket 440 with an elongated hole 440a and an associated hole in a bottom metal sheet 10 of the window door. A bolt 7a passes through an elongated hole 440a as well as the hole (not shown) in the bottom metal sheet 10. A nut 7b is threaded on the bolt and used to apply tension to the bolt connection and thus to lock the position of angular retaining bracket 44 connected to the mounting bracket 440 after the intended window pane position has been reached. There is, of course, also the possibility of forming the mounting bracket 440 directly on the lower end of the guide rail 4a. When the bolted connection 7a, 7b is loosened, the lower end of the guide rail 4a is freely movable inside the stops formed by the elongated hole 440a.

Figure 2:
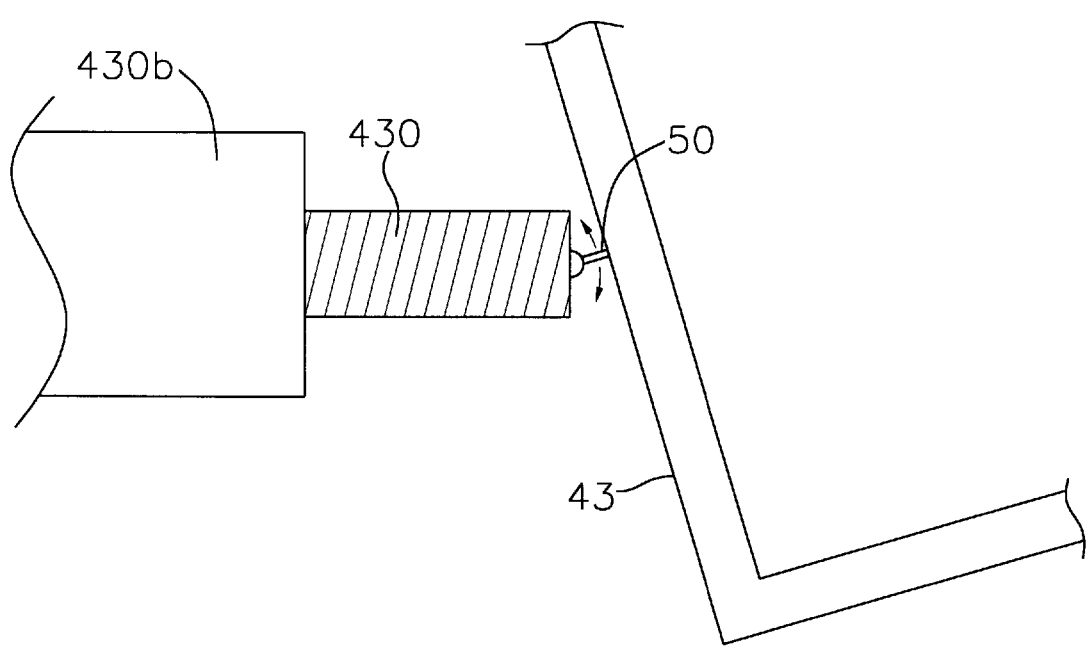
FIG. 2 illustrates a pivotably mounted adjusting bolt according to the invention.

The adjustment of the angle of tilt of the window pane 6 is basically accomplished by means of adjustment means 430, 430b on the right guide rail 4b. For this, an adjusting bolt 430 is used. The adjusting bolt is pivotably mounted at one end on the angular retaining mount 43 by means of a pin 50, as shown in FIG. 2. The adjusting bolt 430 passes through a bushing 430b with inside threads and is fixedly attached to the inside panel 1b of the door, by welding, for example. A tool can engage slot 430a of the adjusting bolt 430. By rotating the adjusting bolt 430 in the threaded bushing 430b, the lower end of the guide rail can be moved back and forth laterally in relation to the passenger compartment. This swivelling movement is transmitted via the window pane 6 to the other guide rail 4a such that the position of the angular mounting bracket 440 is also changed with respect to the bolt 7a.

After the intended position of the window pane is reached, the adjustment of the window pane 6 is completed by locking the position of the first guide rail 4a by means of the bolt connection 7a, 7b. Thus, in this fashion, a single worker can reliably perform the simultaneous adjustment of both guide rails 4a, 4b. Since the window is being rotated as it is moved back and forth by the adjusting bolt, the angle between the window and the adjusting bolt will change as the window is adjusted. Thus, in one embodiment, the adjusting bolt is pivotably mounted as described above. In an alternate embodiment, adjusting bolt 430 is rigidly attached to the angular retaining mount 43 and preferably is also used to mount the cable roller. According to this embodiment, the threaded bushing 430b is rotatably mounted on the door panel 1b and means for the engagement of a tool to rotate the threaded bushing 430b are provided.

It is advantageous to provide means for adjustment and locking of the two guide rails 4a, 4b through the bottom of the vehicle door. Thus a subsequent readjustment of the window pane could be accomplished simply through the bottom of the door, without having to remove the inside door panel.

The disclosure of German Patent application no. 196 11 074.2 filed on Mar. 21, 1996 (copy attached) is incorporated fully herein by reference. Priority of this German patent application is claimed.

What is claimed is:

1. A device for adjustment of a frameless window pane moved by a two-strand cable window lifter comprising:
    an adjusting and locking means for each of two guide rails of the two-strand cable window lifter wherein the adjusting and locking means of a first guide rail of the two-strand cable window lifter has a guide inside of which the first guide rail is freely movable in an unlocked state and wherein the adjusting and locking means of a second guide rail has means for forcibly adjusting the second guide rail,
    wherein the means for forcibly adjusting the second guide rail comprises an adjusting bolt with self-locking threads, and
    wherein the adjusting bolt of the second guide rail engages a bushing attached to an associated cable roller.

2. The device according to claim 1 wherein the guide of the first guide rail comprises an elongated hole, wherein the adjusting and locking means comprises a bolt and nut assembly passing through the hole and engaging an associated automobile, and wherein the lower end of the first guide rail is essentially freely movable in the unlocked state inside of the elongated hole.

3. The device according to claim 2 wherein the elongated hole is formed in an angular mounting bracket connected to the first guide rail.

4. The device according to claim 2 wherein the first guide rail can be locked by means of a bolt connection in the elongated hole.

5. Apparatus for adjusting a frameless window pane moved by a cable window lifter for use in an automobile, the apparatus comprising:

a first guide rail having unlocked and locked states and being freely movable to a limited degree in the unlocked state and fixed in the locked state;

a second guide rail, wherein a window pane is connected between the first guide rail and the second guide rail, movement of the second guide rail causing movement of the first guide rail while in the unlocked state;

means for moving the second guide rail; and means for locking the first guide rail, means for fastening the locking bolt to thereby lock the first guide rail; and means for fastening the locking bolt through the door, wherein an end of the first guide rail comprises an elongated hole, wherein the means for locking the first guide rail comprises a locking bolt for connection to a door of the automobile which engages the hole, and wherein the first guide rail is freely movable with the bolt along the length of the elongated hole in the unlocked state, and wherein the fastening means comprises a worm screw assembly.

6. Apparatus for adjusting a frameless window pane moved by a cable window lifter for use in an automobile, the apparatus comprising:

a first guide rail having unlocked and locked states and being freely movable to a limited decree in the unlocked state and fixed in the locked state;

a second guide rail, wherein a window pane is connected between the first guide rail and the second guide rail, movement of the second guide rail causing movement of the first guide rail while in the unlocked state;

means for moving the second guide rail; and means for locking the first guide rail, means for fastening the locking bolt to thereby lock the first guide rail; and means for fastening the locking bolt through the door, wherein an end of the first guide rail comprises an elongated hole, wherein the means for locking the first guide rail comprises a locking bolt for connection to a door of the automobile which engages the hole, and wherein the first guide rail is freely movable with the bolt along the length of the elongated hole in the unlocked state, and wherein the fastening means comprises a cardan joint.

7. Apparatus for adjusting a frameless window pane moved by a cable window lifter for use in an automobile, the apparatus comprising:

a first guide rail having unlocked and locked states and being freely movable to a limited degree in the unlocked state and fixed in the locked state;

a second guide rail, wherein a window pane is connected between the first guide rail and the second guide rail, movement of the second guide rail causing movement of the first guide rail while in the unlocked state;

means for moving the second guide rail; and means for locking the first guide rail, wherein the means for moving the second guide rail comprises an adjustable bolt mounted in a threaded housing for attachment to a door of the automobile and wherein the adjustable bolt engages the second guide rail.

8. The apparatus according to claim 7 wherein an end of the first guide rail comprises an elongated hole, wherein the means for locking the first guide rail comprises a locking bolt for connection to a door of the automobile which engages the hole, and wherein the first guide rail is freely movable with the bolt along the length of the elongated hole in the unlocked state.

9. The apparatus according to claim 8 further comprising means for fastening the locking bolt to thereby lock the first guide rail.

10. The apparatus according to claim 9 further comprising means for fastening the locking bolt through the door.

11. The apparatus according to claim 8 wherein the first guide rail is freely moveable at a bottom end.

12. The apparatus according to claim 7 wherein the window pane comprises a first end portion connected to the first guide rail and a second end portion connected to the second guide rail.

13. The apparatus according to claim 7 wherein the adjustable bolt is pivotably connected at one end to the second guide rail.

14. The apparatus according to claim 7 wherein the threaded housing is pivotably connected to the door.

15. The apparatus according to claim 7 further comprising means for adjusting the adjustable bolt through the door.

16. The apparatus according to claim 15 wherein the adjusting means comprises a worm screw assembly.

17. The apparatus according to claim 15 wherein the adjusting means comprises a cardan joint.

18. An apparatus which adjusts a frameless window pane moved by a cable window lifter for use in an automobile, the apparatus comprising:

a first guide rail having unlocked and locked states and being freely movable to a limited degree in the unlocked state and fixed in the locked state;

a second guide rail, wherein the window pane is connected between the first guide rail and the second guide rail, movement of the second guide rail causing movement of the first guide rail while in the unlocked state; and an adjustable fastener mounted for attachment to a door of the automobile for moving the second guide rail, wherein the adjustable fastener engages the second guide rail for moving the second guide rail.

19. The apparatus according to claim 18 further comprising a locking element operatively coupled to the first guide rail.

20. The apparatus according to claim 19 wherein the adjustable fastener is mounted in a threaded housing for attachment to a door of the automobile for moving the second guide rail.

* * * * *